United States Patent
Hsieh et al.

(10) Patent No.: US 11,066,522 B2
(45) Date of Patent: Jul. 20, 2021

(54) AMPHIPHILIC POLYMER, AMPHIPHILIC POLYMER MANUFACTURING METHOD, CONTACT LENS MATERIAL INCLUDING THE AMPHIPHILIC POLYMER, AND CONTACT LENS MANUFACTURING METHOD

(71) Applicant: NATIONAL CHIAO TUNG UNIVERSITY, Hsinchu (TW)

(72) Inventors: Yun-Ru Hsieh, Taichung (TW); Dean-Mo Liu, Zhubei (TW); Yu-Cheng Jian, Taipei (TW); Wei-Ting Huang, Taitung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 163 days.

(21) Appl. No.: 16/262,468

(22) Filed: Jan. 30, 2019

(65) Prior Publication Data
US 2019/0359776 A1 Nov. 28, 2019

(30) Foreign Application Priority Data
May 22, 2018 (TW) ................. 107117399

(51) Int. Cl.
| | | |
|---|---|---|
| *C08G 77/388* | (2006.01) | |
| *C08G 77/46* | (2006.01) | |
| *G02B 1/04* | (2006.01) | |
| *C08J 3/24* | (2006.01) | |
| *C08L 33/14* | (2006.01) | |
| *C08G 77/08* | (2006.01) | |

(52) U.S. Cl.
CPC ............ *C08G 77/46* (2013.01); *C08G 77/08* (2013.01); *C08G 77/388* (2013.01); *C08J 3/24* (2013.01); *C08L 33/14* (2013.01); *G02B 1/043* (2013.01)

(58) Field of Classification Search
CPC .............................. C08G 77/26; C08G 77/388

USPC ........................................................... 528/38
See application file for complete search history.

(56) References Cited

U.S. PATENT DOCUMENTS

| | | | | |
|---|---|---|---|---|
| 6,398,911 B1 * | 6/2002 | Schroeder | ............... | C08B 15/00 162/164.4 |
| 6,517,678 B1 * | 2/2003 | Shannon | ................. | C08B 31/04 162/157.1 |
| 6,620,295 B2 * | 9/2003 | Shannon | ................. | C08B 31/04 162/157.1 |
| 8,142,835 B2 * | 3/2012 | Muller | ............. | B29D 11/00865 427/2.1 |
| 2012/0156361 A1 * | 6/2012 | Muller | ............. | B29D 11/00865 427/2.31 |
| 2013/0011460 A1 | 1/2013 | Liu et al. | | |

FOREIGN PATENT DOCUMENTS

| | | | |
|---|---|---|---|
| CN | 110915801 | * | 3/2020 |
| TW | 201302244 A1 | | 1/2013 |

OTHER PUBLICATIONS

"Polydimethylsiloxane modified chitosan", Carbohydrate Polymers 76 (2009), pp. 286-278 (Year: 2009).*

* cited by examiner

*Primary Examiner* — Margaret G Moore
(74) *Attorney, Agent, or Firm* — Birch, Stewart, Kolasch & Birch LLP

(57) ABSTRACT

An amphiphilic polymer, an amphiphilic polymer manufacturing method, a contact lens material including the amphiphilic polymer, and contact lens manufacturing method are provided. The amphiphilic polymer includes poly(dimethylsiloxane) and amphiphilic chitosan bonded to the same. The contact lens material includes the amphiphilic polymer. The amphiphilic polymer manufacturing method includes providing a poly(dimethylsiloxane), providing an amphiphilic chitosan, and bonding the amphiphilic chitosan to the poly(dimethylsiloxane).

5 Claims, 6 Drawing Sheets

AMPHIPHILIC POLYMER, AMPHIPHILIC POLYMER MANUFACTURING METHOD, CONTACT LENS MATERIAL INCLUDING THE AMPHIPHILIC POLYMER, AND CONTACT LENS MANUFACTURING METHOD

BACKGROUND OF THE INVENTION

1. Field of the Invention

The present invention generally relates to an amphiphilic polymer. More particularly, the present invention generally relates to a silicone-conjugated poly(dimethylsiloxane) amphiphilic chitosan co-polymer which can be used as a contact lens material.

2. Description of the Prior Art

High oxygen permeability, transmittance, and hydrophility are important properties of contact lens. Moreover, the functionalization (e.g. in terms of health care, diagnostic, and artificial intelligence) of contact lens is the target of future development. Conventionally, silicon is added into the composition solution of contact lens to increase the oxygen permeability of the contact lens. However, the adding of silicon results in the decreasing of transmittance and the immiscibility.

Highly hydrophobic poly(dimethylsiloxane) (PDMS) has high oxygen permeability. If it can be bonded with a highly hydrophilic polysaccharide having a —COOH group, its amphiphilic property can increase its miscibility in a hydrophilic hydrogel substrate, hence enhancing the transmittance and other properties. For example, in its application in hydrogel materials such as contact lens, properties such as oxygen permeability could be greatly improved, which is beneficial to the development and value of hydrogel in functional medical materials and medicines.

Conventionally, however, organic synthesis technology is used for purification in the manufacturing process of bonding the PDMS with highly hydrophilic polysaccharide having a —COOH group, wherein a product is separated by the polarity difference between the copolymer and the PDMS. The process is complicated.

SUMMARY OF THE INVENTION

An object of the present invention is to provide an amphiphilic polymer for manufacturing contact lens.

It is another object of the present invention to provide an amphiphilic polymer manufacturing method.

It is another object of the present invention to provide a contact lens material comprising an amphiphilic polymer, which is high in oxygen permeability, transmittance, and water retention.

The amphiphilic polymer of the present invention includes a poly(dimethylsiloxane) and an amphiphilic chitosan bonded to the same.

In one embodiment, the poly(dimethylsiloxane) includes an amino group (—NH$_2$).

In one embodiment, the amphiphilic chitosan includes a carboxyl group (—COOH).

In one embodiment, the amphiphilic polymer is represented by the formula

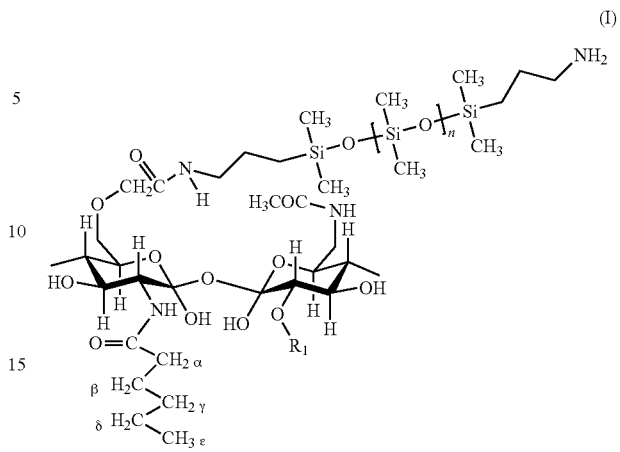

(I)

The contact lens material of the present invention includes the above described amphiphilic polymer.

The amphiphilic polymer manufacturing method of the present invention includes (S100) providing an amphiphilic chitosan, (S200) providing a poly(dimethylsiloxane), and (S300) bonding the amphiphilic chitosan to the poly(dimethylsiloxane).

In one embodiment, the step of (S300) includes using 1-ethyl-3-(3-dimethylaminopropyl)carbodiimide (EDC) as a catalyst.

In one embodiment, the step of (S300) includes using N-Hydroxysuccinimide (NHS) as a catalyst. The method of manufacturing contact lens includes (T100) providing the amphiphilic polymer, (T200) providing a hydroxyethylmethacrylate (HEMA) monomer solution or a siloxanes monomer solution, (T300) providing a crosslinking agent, and (T400) applying UV light or heat to perform crosslinking.

DETAILED DESCRIPTION OF THE PREFERRED EMBODIMENT

The amphiphilic polymer of the present invention includes a poly(dimethylsiloxane) and an amphiphilic chitosan bonded to the poly(dimethylsiloxane). The amphiphilic chitosan is preferably selected from the group consisting of carboxymethyl hexanoyl chitosan (CHC), deoxycholic acid modified carboxymethylated chitosan (DCMC), lauroyl sulfated chitosan (LSC), and methylpyrrolidone chitosan (MPC).

In one embodiment, the poly(dimethylsiloxane) includes an amino group (—NH$_2$). The amphiphilic chitosan includes a carboxyl group (—COOH). More particularly, the amphiphilic polymer is preferably a silicone-conjugated poly(dimethylsiloxane) amphiphilic chitosan co-polymer, which is represented by the formula

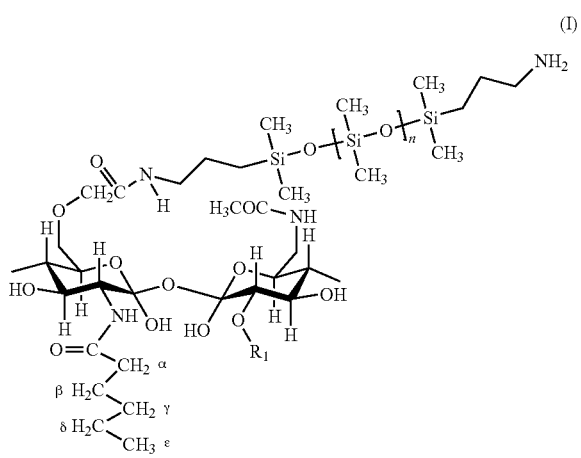

(I)

The amino group of the poly(dimethylsiloxane) is bonded with the carboxyl group of the amphiphilic chitosan. Accordingly, the poly(dimethylsiloxane) is bonded with the amphiphilic chitosan. In different embodiments, however, the poly(dimethylsiloxane) is not limited to include an amino group (—NH$_2$), wherein the amphiphilic chitosan is not limited to including a carboxyl group (—COOH). Thus, the poly(dimethylsiloxane) can be bonded with the amphiphilic chitosan with functional groups other than the amino group and the carboxyl group.

The contact lens material of the present invention includes the above described amphiphilic polymer. Specifically, there exists good miscibility between the amphiphilic polymer and the hydrophilic hydrogel substrate of the contact lens. Since the amphiphilic polymer has both good hydrophilic and hydrophobic properties due to the poly(dimethylsiloxane) having high oxygen permeability and the chitosan having high hydrophilicity, it has a self-assembly capability of encapsulating various kinds of medicine (i.e. functionalization). Therefore, besides being used as a contact lens material having good oxygen permeability, transmittance, and water retention, the amphiphilic polymer of the present invention can be widely used in medical materials and novel medicines.

Figure 1:
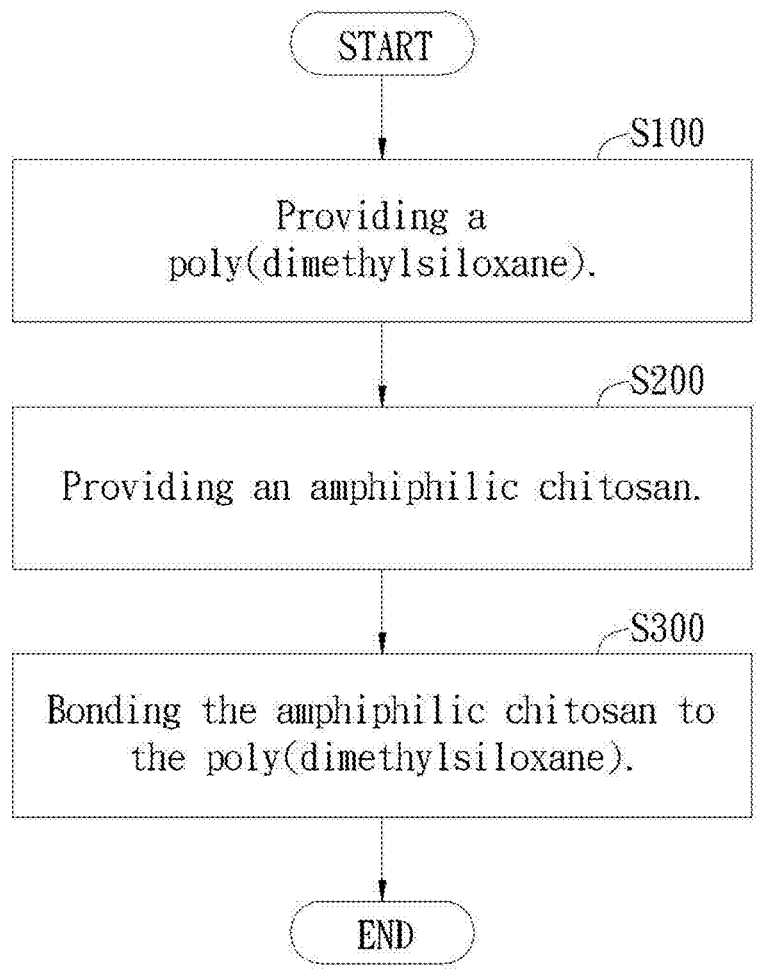
FIG. 1 is a flow chart of an embodiment of the amphilic polymer manufacturing method of the present invention.

As shown in the flow chart in FIG. 1, the amphiphilic polymer manufacturing method of the present invention includes the following steps.

Step S100 is a step that provides an amphiphilic chitosan. More particularly, in one embodiment, step S100 includes dissolving powders of amphiphilic chitosan (CHC) having carboxyl group modified hydrophilic end and hexanoyl group modified hydrophobic end in the water to form an amphiphilic chitosan solution.

Step S200 is a step that provides a poly(dimethylsiloxane). More particularly, in one embodiment, step S200 includes dissolving amine terminated poly(dimethylsiloxane in the isopropanol (IPA) and adding N-Hydroxysuccinimide (NHS) into the same.

Step S300 is a step that bonds the amphiphilic chitosan to the poly(dimethylsiloxane). More particularly, in one embodiment, step S300 includes using 1-ethyl-3-(3-dimethylaminopropyl)carbodiimide (EDC) as a catalyst.

Specifically, in one embodiment, a silicone-conjugated poly(dimethylsiloxane) amphiphilic chitosan co-polymer is prepared by the following steps.

(1) 5 mL of 3 wt % powders of amphiphilic chitosan (CHC) having carboxyl group modified hydrophilic end and hexanoyl group modified hydrophobic end is dissolved in 95 mL of deionized water in a conical flask and stirred to form a 0.15 wt % amphiphilic chitosan solution.

(2) 45 mL of IPA is added into the amphiphilic chitosan solution obtained in (1), wherein 30 μL of 1.0 wt % N-Hydroxysuccinimide (NHS) is added into the same as a catalyst.

(3) Meanwhile, 5 mL of IPA and 200 μL of amine terminated poly(dimethylsiloxane are added into another flask and stirred gently.

(4) After 4 hours, the solution of (3) is added into the conical flask in drops with stirring.

(5) Increasing the stirring speed, wherein 1.0 wt % of 1-ethyl-3-(3-dimethylaminopropyl)carbodiimide (EDC) is added in rapid stirring. Decreasing the stirring speed after 30 minutes and stirring gently for 12-24 hours to complete the reaction.

(6) Obtaining a dialysate by dialyzing the poly(dimethylsiloxane) amphiphilic chitosan (CHC-PDMS) solution with a dialysis membrane (Mw 14000) and IPA for 12-48 hours.

(7) Drying the obtained dialysate in an oven with 600° C. to obtain the silicone-conjugated poly(dimethylsiloxane) amphiphilic chitosan co-polymer. The 1-ethyl-3-(3-dimethylaminopropyl)carbodiimide and the N-Hydroxysuccinimide are catalysts.

Figure 2:
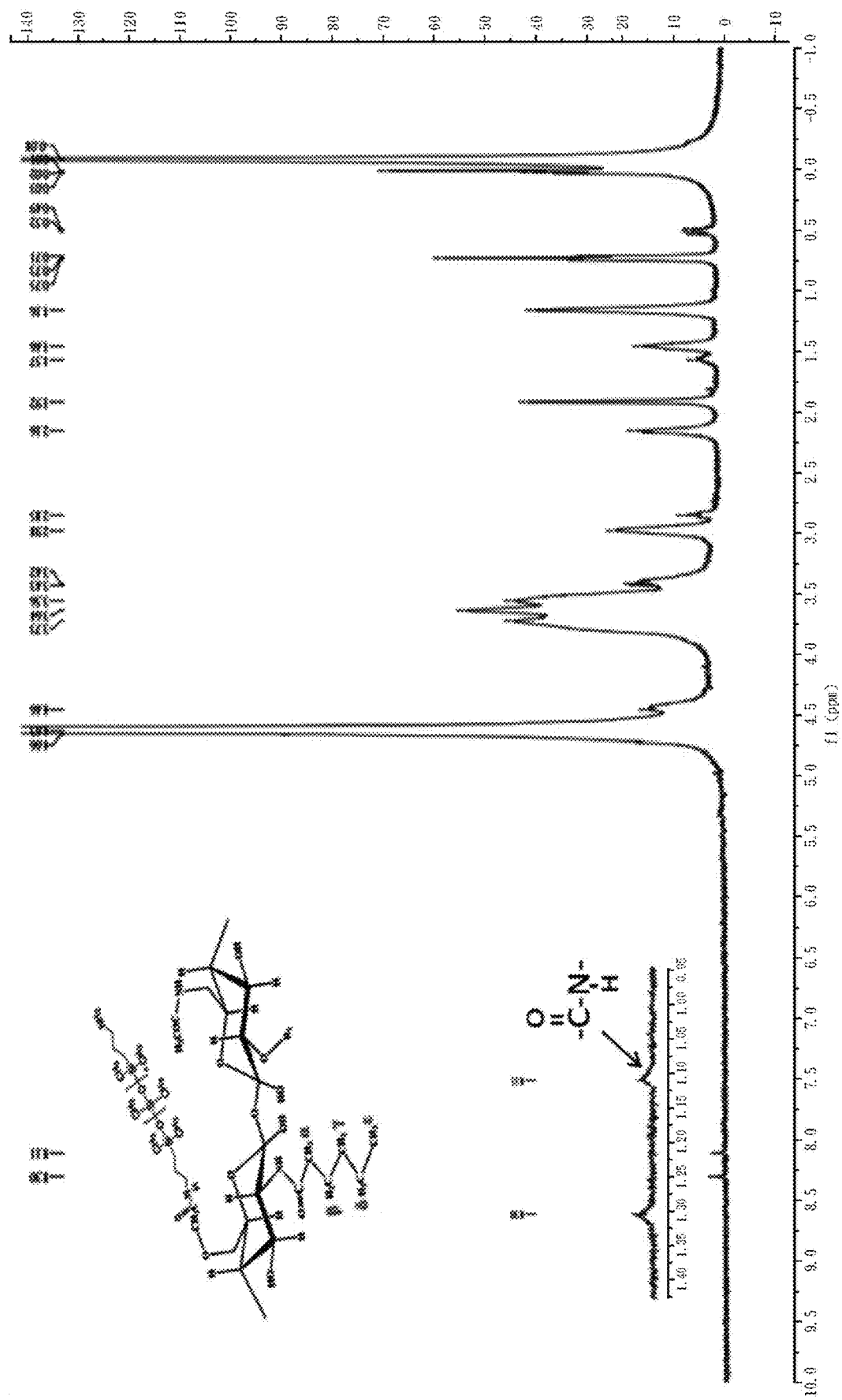
FIG. 2 is a nuclear magnetic resonance (NMR) analysis result of the amphiphilic polymer of the present invention.

The silicone-conjugated poly(dimethylsiloxane) amphiphilic chitosan co-polymer obtained by the above process is dissolved in a D$_2$O to a concentration of 3 wt % and analyzed by nuclear magnetic resonance (NMR 500, America VARIAN). FIG. 2 is the analysis result. It is verified that the poly(dimethylsiloxane) is bonded with the amphiphilic chitosan since the existence of a —O═C—N—H— functional group can observed in FIG. 2.

Figure 3:
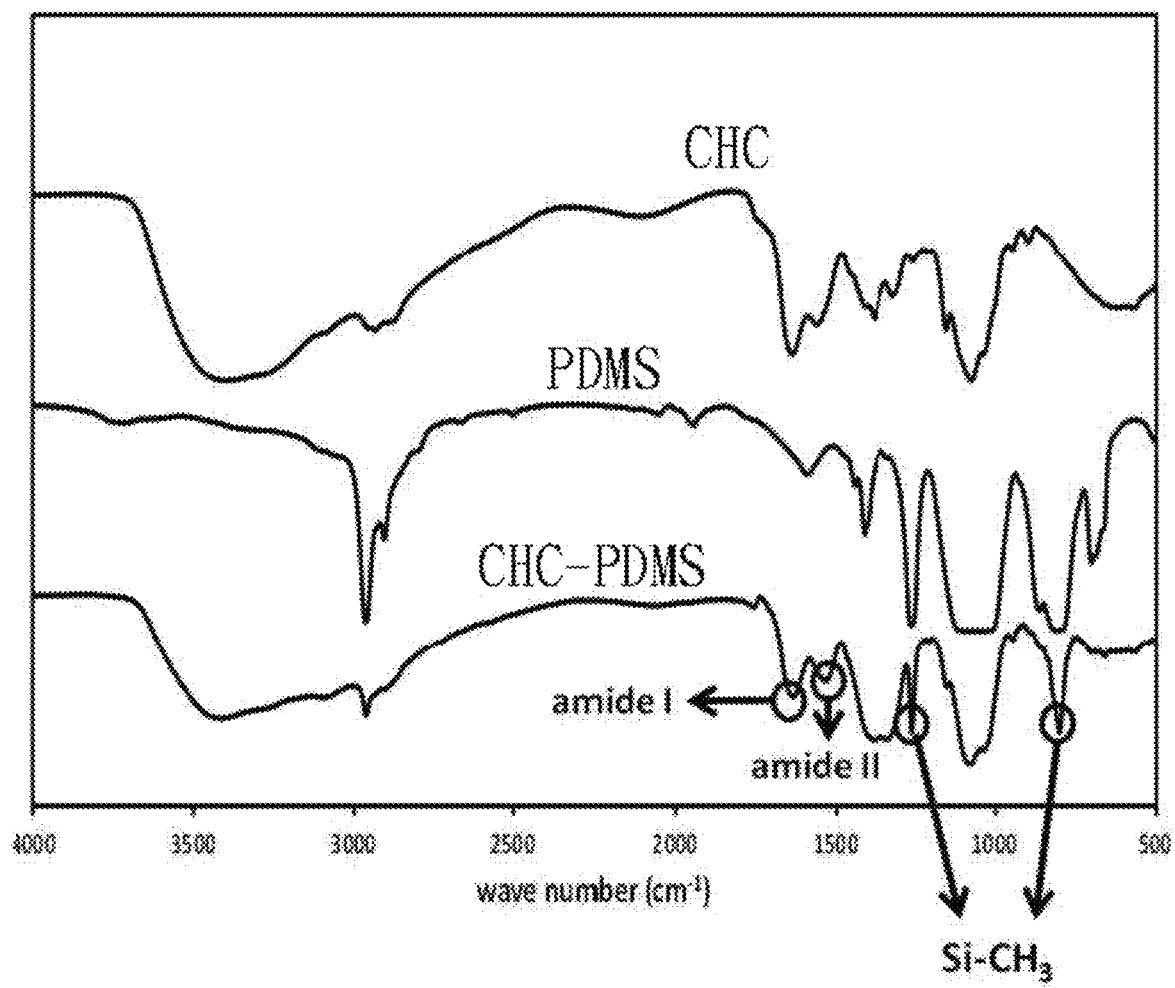
FIG. 3 is a Fourier-transform infrared spectroscopy (FT-IR) analysis result of the amphiphilic polymer of the present invention.

The silicone-conjugated poly(dimethylsiloxane) amphiphilic chitosan co-polymer obtained by the above process is blended with KNr to a concentration of 0.1 wt %, wherein the volume of the CHC-PDMS with respect to the volume of KBR is 1:8, and is grinded into powder in a short time to avoid absorbing moisture in the air that effects signal. At last, the powder is pressed into a tablet, which is analyzed by Fourier-transform infrared spectroscopy (Unican Mattson Mode 7000) under the condition of 4 cm$^{-1}$ resolution and 32 scanning times. FIG. 3 is the analysis result. It is verified that the poly(dimethylsiloxane) is bonded with the amphiphilic chitosan since the existence of functional groups of amide I, amide II, SiCH$_3$ can be observed in FIG. 3.

Figures 4A, 4B:
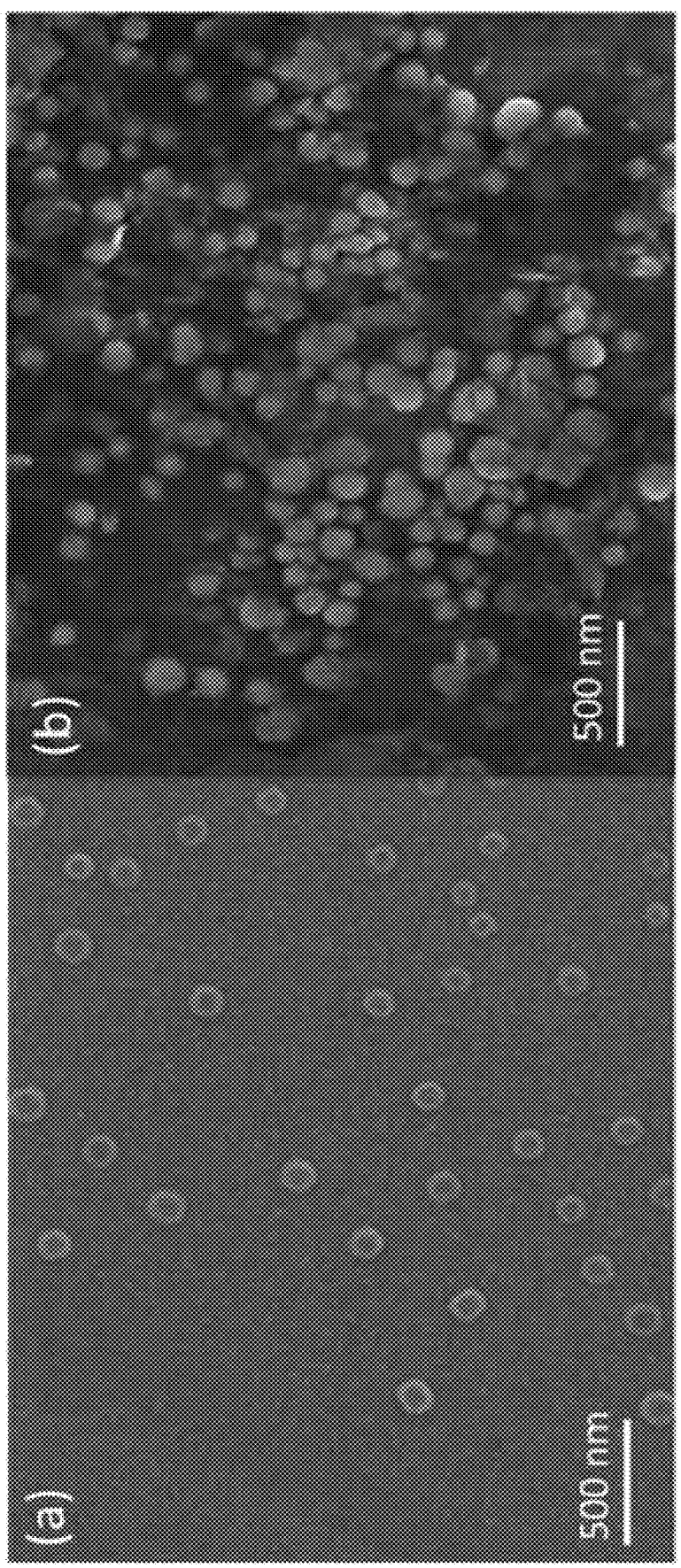
FIGS. 4A and 4B are respectively the scanning electron microscope (SEM) analysis result of the amphiphilic chitosan and the silicone-conjugated poly(dimethylsiloxane) amphiphilic chitosan co-polymer of the present invention.

The scanning electron microscope is used to analyze the self-assembly states of the amphiphilic chitosan and the silicone-conjugated poly(dimethylsiloxane) amphiphilic chitosan co-polymer produced by the above process, wherein the analysis results are respectively shown in FIGS. 4A and 4B. It can be observed in FIG. 4B that the self-assembly particle size of CHC-PDMS is about 150-200 nm. Accordingly, the self-assembly of CHC-PDMS is the same as that of the amphiphilic chitosan, as shown in FIG. 4A, wherein both form nano-particles and have similar size and shape.

Tests of the amphiphilic polymer of the present invention as contact lens material.

Various concentration of CHC-PDMS co-polymer, deionized water, and Hydroxyethylmethacrylate (HEMA) monomer solution are blended in the composition listed in Table 1 as contact lens material and are further made into contact lenses to be analyzed. 10 uL of Darcour1173 (Sigma-Aldrich, USA) is added as a crosslinking agent. Contact lens having CHC-PDMS co-polymer is produced by applying 365 nm wave length UV light for 20-40 minutes, immersing and oscillating in 60 wt % above ethyl alcohol solution for 2 hours, and oscillating in deionized water for 2 hours. In different embodiments, Hydroxyethylmethacrylate (HEMA) monomer solution can be replaced by siloxane monomer solution. The crosslinking of the monomers can be performed by applying heat.

TABLE 1

The composition of 1 mL of repolymerization solution

| CHC-PDMS | HEMA | DI water |
|---|---|---|
| 0 mg | 655 μl | 335 μl |
| 10 mg | 655 μl | 325 μl |
| 20 mg | 655 μl | 315 μl |

Transmittance Analysis

Figure 5:
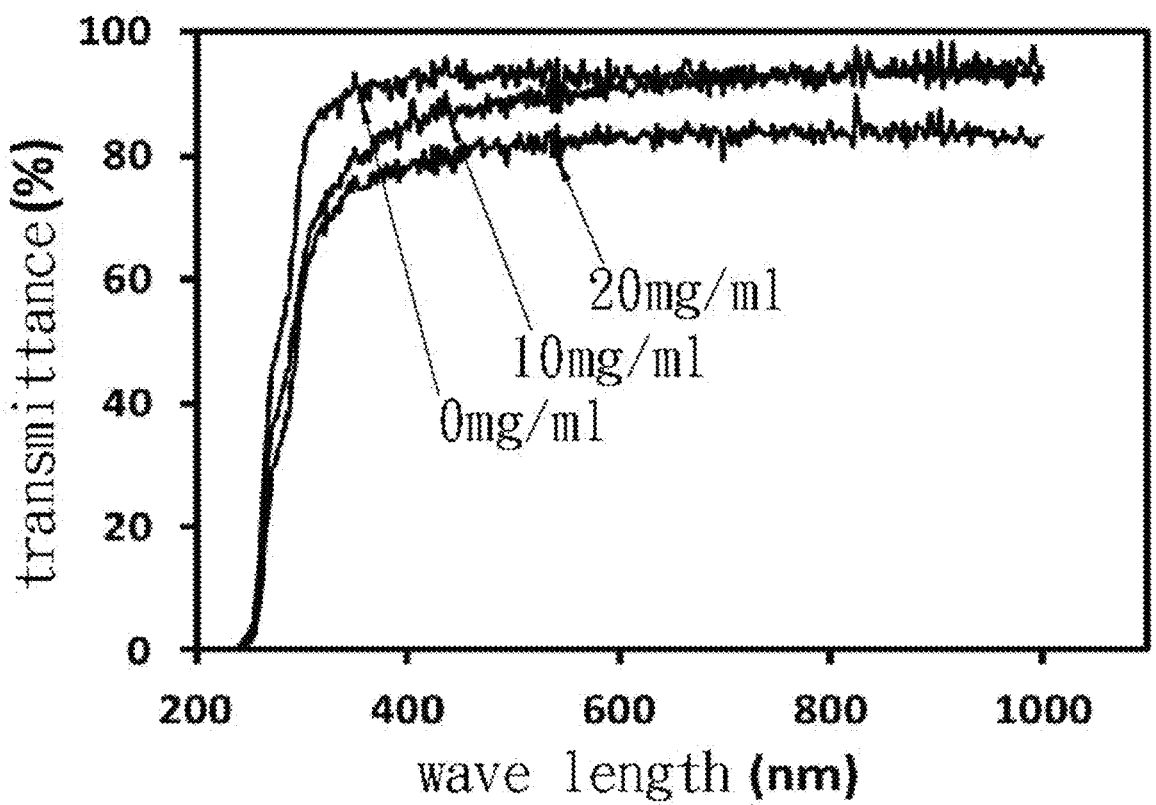
FIG. 5 is a transmittance analysis result.

The contact lenses obtained are analyzed by UV-Visible spectrometer (Evolution 300, Thermo). As shown in FIG. 5, adding too much amphiphilic polymer would result in slight decrease in transmittance (90% to 80%). However, the differences between the transmittance of the contact lenses obtained and the commercial contact lenses are small, wherein the transmittance of the contact lenses obtained and the commercial contact lenses are all good.

Oxygen Permeability Analysis

Oxygen permeability analysis is performed on the contact lenses obtained. The Dk values of the poly-HEMA hydrogel contact lenses with different content of CHC-PDMS co-polymer are respectively 10.2 (0% CHC-PDMS), 14.3 (1.0% CHC-PDMS), and 17.3 (2.0% CHC-PDMS), wherein the Dk value increases obviously with the content of CHC-PDMS co-polymer. Accordingly, the contact lenses using the amphiphilic polymer of the present invention as the material have better oxygen permeability.

Water Retention Analysis

The contact lenses obtained are dried in an oven and weighed as Wd. Then, wait until the contact lenses are saturated, wipe the surface dry and weigh as Ww. Afterward, the contact lenses are placed in a closed container and weighed as Wt periodically.

The water retention could be calculated with the following formula.

$$\text{Water Retention (\%)} = 100\% \times (Wt - Wd)/(Ww - Wd)$$

Figure 6:
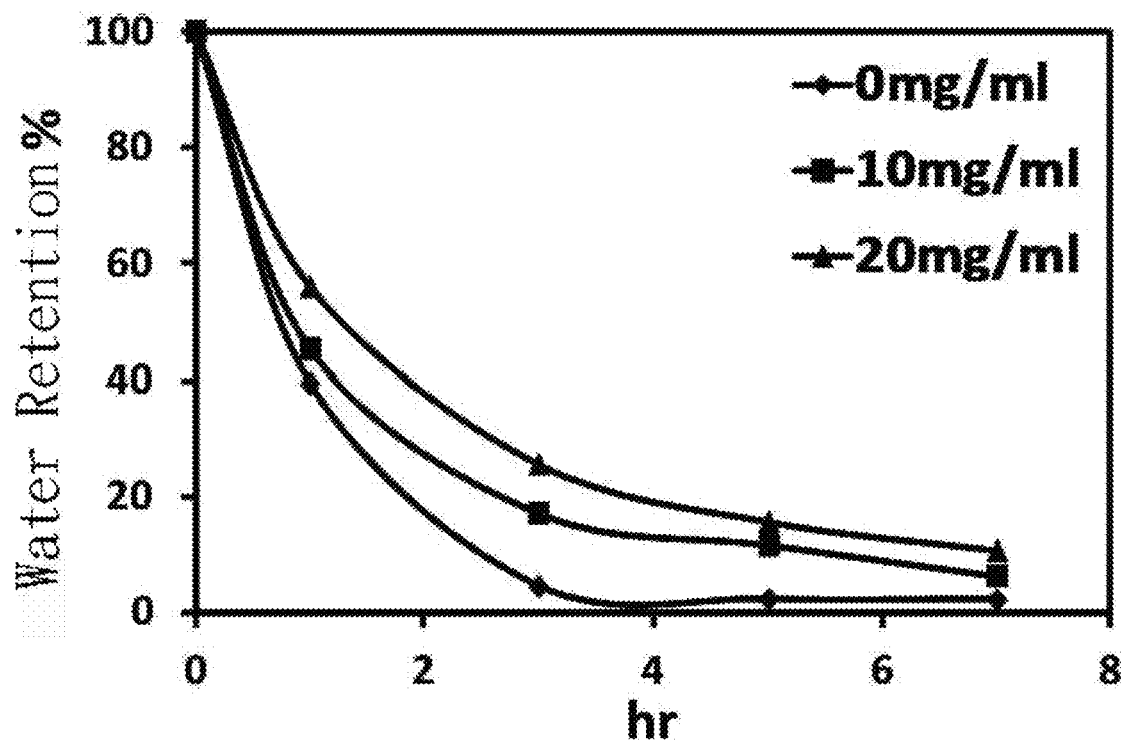
FIG. 6 is a water retention analysis result.

As shown in FIG. 6, in the water retention analysis, the contact lenses having more added CHC-PDMS co-polymer in the preparation process have higher water retention. Presumably it is the result of having the —COOH functional group in amphiphilic chitosan, since it belongs to highly hydrophilic groups.

Cell Metabolic Activity Analysis

Figure 7:
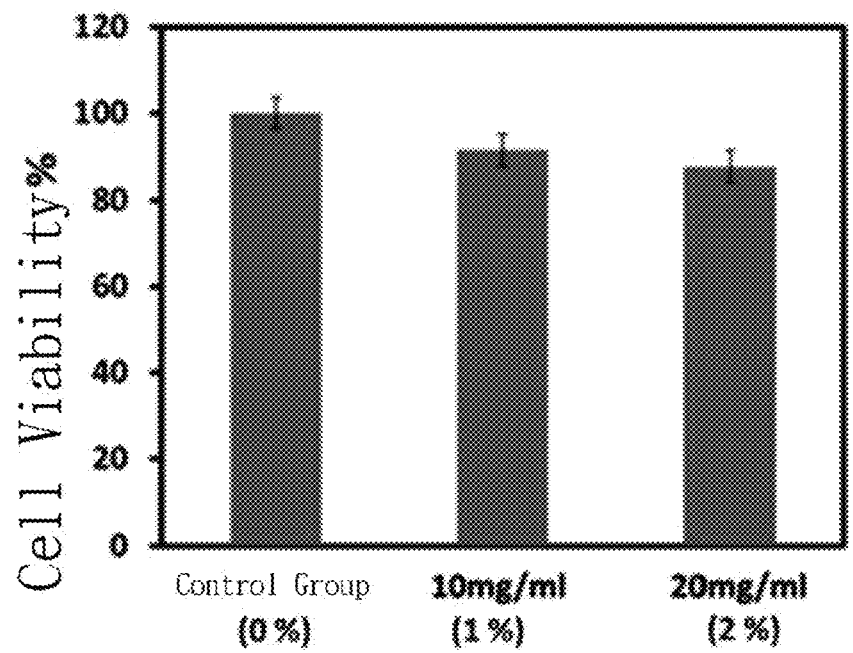
FIG. 7 is a cell metabolic activity analysis result.

Cell metabolic activity analysis is performed on the contact lenses obtained with bovine cornea endothelial cell (BCE). As shown in FIG. 7, after 24 hours of cell cultivation, the contact lenses demonstrate cell viability higher than 90%.

In accordance with the above analysis results, the contact lens using the amphiphilic polymer of the present invention as the material has good oxygen permeability, transmittance, water retention, and cell viability. Hence the problem of transmittance and immiscibility decrease resulted from adding silicon to increase oxygen permeability in commercial contact lenses is resolved.

Intraocular Pressure (IOP) Analysis

Glaucoma rabbits having intraocular pressure higher than 21 mmHg are used to evaluate the therapeutic efficacy of the contact lens which is able to carry medicine, wherein the right eyes are the experimental group (high intraocular pressure: 27-30 mmHg) and the left eyes are the control group (normal intraocular pressure).

Figure 8:
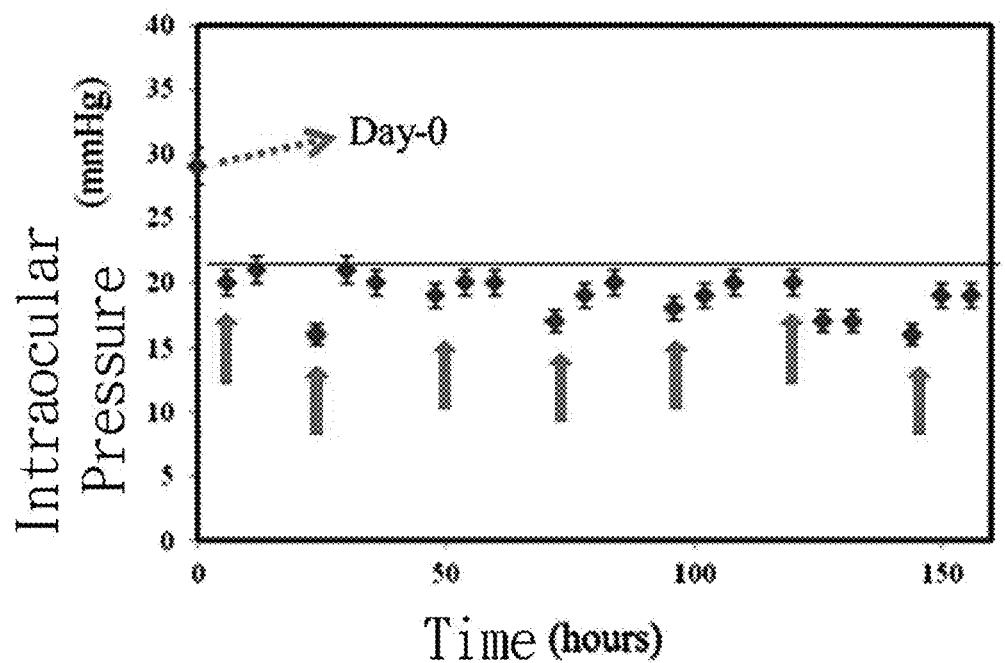
FIG. 8 is an Intraocular pressure analysis result.

The contact lenses loaded with Glaucoma medicine (latanoprost, 10 μg) are worn 8 hours per day for 7 days. As shown in FIG. 8, the solid arrows indicate the time the medicine-loaded contact lenses are replaced. After the therapy of wearing medicine-loaded contact lenses, the intraocular pressure decreases significantly and rapidly (from 30 mmHg to lower than 20 mmHg). Accordingly, the above described contact lenses are capable of encapsulating and releasing medicine. In different embodiments, the medicine is not limited to Glaucoma medicine and could be anti-allergic medicine, conjunctivitis medicine, etc.

In the preparation process of the above described contact lenses, the medicine, the CHC-PDMS co-polymer, the deionized water, and the HEMA monomer solution are blended to form the contact lens material and such material is further made into contact lenses and thus loading the medicine into the contact lenses.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An amphiphilic polymer manufacturing method, comprising:
   (S100) providing an amphiphilic chitosan;
   (S200) providing a poly(dimethylsiloxane); and
   (S300) bonding the amphiphilic chitosan to the poly (dimethylsiloxane) by using 1-ethyl-3-(3-dimethylaminopropyl)carbodiimide (EDC) as a catalyst.

2. An amphiphilic polymer manufacturing method, comprising:
   (S100) providing an amphiphilic chitosan;
   (S200) providing a poly(dimethylsiloxane); and
   (S300) bonding the amphiphilic chitosan to the poly (dimethylsiloxane) by using N-Hydroxysuccinimide (NETS) as a catalyst.

3. A method of manufacturing contact lens, comprising:
   (T100) providing an amphiphilic polymer including:
      a poly(dimethylsiloxane); and
      an amphiphilic chitosan bonded to the poly(dimethylsiloxane);
   (T200) providing a hydroxyethylmethacrylate (HEMA) monomer solution or a siloxanes monomer solution;
   (T300) providing a crosslinking agent; and
   (T400) applying UV light or heat to perform crosslinking.

4. A method of manufacturing contact lens, comprising:
   (T100) providing an amphiphilic polymer including:
      a poly(dimethylsiloxane); and
      an amphiphilic chitosan bonded to the poly(dimethylsiloxane);

wherein the poly(dimethylsiloxane) includes an amino group (—NH$_2$);

(T200) providing a hydroxyethylmethacrylate (HEMA) monomer solution or a siloxanes monomer solution;

(T300) providing a crosslinking agent; and (T400) applying UV light or heat to perform crosslinking.

5. A method of manufacturing contact lens, comprising:

(T100) providing an amphiphilic polymer including:
a poly(dimethylsiloxane); and
an amphiphilic chitosan bonded to the poly(dimethylsiloxane);
wherein the amphiphilic chitosan includes a carboxyl group (—COOH);

(T200) providing a hydroxyethylmethacrylate (HEMA) monomer solution or a siloxanes monomer solution;

(T300) providing a crosslinking agent; and (T400) applying UV light or heat to perform crosslinking.

* * * * *